(12) United States Patent
Burkhardt et al.

(10) Patent No.: US 7,917,379 B1
(45) Date of Patent: Mar. 29, 2011

(54) LARGE-SCALE SUPPLY CHAIN PLANNING SYSTEM AND METHOD

(75) Inventors: Thomas Burkhardt, Dallas, TX (US);
Sanjay K. Mishra, Irving, TX (US);
Kesavan Shanmugam, Flower Mound, TX (US); Deepthi Sigireddi, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1293 days.

(21) Appl. No.: 09/963,960

(22) Filed: Sep. 25, 2001

(51) Int. Cl.
*G06F 17/60* (2006.01)

(52) U.S. Cl. .......................................................... 705/7

(58) Field of Classification Search .................. 705/8, 7
See application file for complete search history.

(56) References Cited

U.S. PATENT DOCUMENTS

| | | | | |
|---|---|---|---|---|
| 5,216,593 A | * | 6/1993 | Dietrich et al. | 345/467 |
| 5,596,493 A | * | 1/1997 | Tone et al. | 705/10 |
| 5,675,791 A | * | 10/1997 | Bhide et al. | 707/205 |
| 5,953,707 A | * | 9/1999 | Huang et al. | 705/10 |
| 5,983,195 A | * | 11/1999 | Fierro | 705/10 |
| 6,219,649 B1 | * | 4/2001 | Jameson | 705/8 |
| 6,560,501 B1 | * | 5/2003 | Walser et al. | 700/99 |
| 6,701,201 B2 | * | 3/2004 | Hegde et al. | 700/107 |
| 6,704,692 B1 | * | 3/2004 | Banerjee et al. | 702/189 |
| 2002/0049759 A1 | * | 4/2002 | Christensen | 707/10 |

OTHER PUBLICATIONS

Ertogral, Kadir, Wu, S. David, "Auction-Theoretic Coordination of Production Planning in the Supply Chain", IIE Transactions, Oct. 2000, p. 931-940.*
Lawson, David G., Porteus, Evan L., "Multistage Inventory Management with Expediting", Operations Research, Nov./Dec. 2000, p. 787-893.*
Rao, Uday, Scheller-Wolf, Alan, Tayur, Sridhar, "Development of a Rapid-Response Supply Chain at Caterpillar", Operations Research, Mar./Apr. 2000, p. 189-204.*
Chopra, Sunil; Meindl, Peter; Supply Chain Management: Strategy, Planning, and Operation, Prentice Hall, Oct. 2000.*
DeWitt, David J.; Gray, Jim; "Parallel Database Systems: The Future of High Performance Database Processing", ACM, vol. 36, No. 6, Jun. 1992.*

* cited by examiner

*Primary Examiner* — Romain Jeanty
(74) *Attorney, Agent, or Firm* — Booth Udall, PLC; Steven J. Laureanti

(57) ABSTRACT

A system and method for performing large scale supply chain planning is disclosed, which includes at least one database with a plurality of partitions. A large scale, supply chain planning problem is decomposed into a plurality of independent and isolated sub-problems. The data for each sub-problem is maintained in a separate database partition. The sub-problems are preferably solved by separate planning processes operating in parallel in a distributed database processing environment.

27 Claims, 2 Drawing Sheets

LARGE-SCALE SUPPLY CHAIN PLANNING SYSTEM AND METHOD

TECHNICAL FIELD OF THE INVENTION

The present invention relates in general to computer-implemented supply chain planning and, in particular, but not exclusively, to a large-scale supply chain planning system and method.

BACKGROUND OF THE INVENTION

A supply chain planning problem can be defined, for example, as a series of planning problems that typically includes such problems as (1) demand forecasting, (2) service level planning, and (3) replenishment planning. Demand forecasting is a method used to project the future demand for a particular item at a particular location, based on historical sales information. Service level planning is a method used to compute safety stock limits and ordering policies for items, based on customer service levels for the items and their future demand. Replenishment planning is a method used to generate suggested purchase orders and distribution orders for items, based on the future demand and actual orders for the items, but still respecting the safety stock limits for the items and other supply chain constraints imposed.

The size of a supply chain planning problem is typically measured by (1) the number of locations within the supply chain, (2) the number of items in the supply chain, (3) the length of the planning period, and (4) the complexity of the business rules imposed. For example, in the retail industry, a retailer might have to manage an inventory of more than 100,000 items at 1,000 locations for a period of 26 weeks. As the magnitudes of these numbers indicate, a large-scale supply chain planning problem involves the processing and movement of enormous amounts of data. Typically, supply chain planning data (e.g., inventory item information) can be stored in a relational database.

FIG. 1 illustrates a typical supply chain planning system 10. When a planning process application 12 (e.g., planning application software executed by a computer processor) is initiated, the application reads, via a suitable transmission link 14, the data needed for a planning problem from a database 16. Next, the planning process application 12 solves the planning problem by applying one or more planning algorithms to the retrieved data, in accordance with any supply chain constraints imposed. The results of the planning process 12 (e.g., solutions to the planning problem or problems) are then written, via a suitable link 18, to the database 16.

Unfortunately, large-scale, supply chain planning is not performed very efficiently using only one planning process. For example, as illustrated by FIG. 1, in order to solve a large-scale, supply chain planning problem, all of the data maintained for all items at all locations have to be read from a single database and processed. Then, the solutions or resulting data have to be written back to that database. Consequently, for a supply chain with a relatively large number of items and locations, the volume of data to be processed and conveyed to/from the database is tremendous. In fact, for such a large dataset, the planning process and database read/write operations for a conventional system require an exceedingly large amount of processing time.

FIG. 2 illustrates how a planning process for a large scale supply chain can be performed more rapidly than the planning process shown in FIG. 1. In FIG. 2, a large planning problem is solved by a plurality of planning processes 22, 24, 26. The planning processes 22, 24 and 26 are performed simultaneously. For example, each planning process 22, 24, 26 reads a respective subset of data from the database 28, and then solves the planning problem by applying planning algorithms to the respective data subsets and the supply chain constraints imposed. Finally, each planning process 22, 24, 26 writes the respective results (e.g., solutions to the planning problem) to the database 28.

As illustrated by FIG. 2, although the simultaneous use of multiple planning processes may improve the scalability (ease with which a system can be modified to accommodate increases in system loads and transaction complexity) of large scale planning systems to a certain extent, the simultaneous reads and writes of the large subsets of data to and from the database by the multiple planning processes create a severe bottleneck for the flow of data at the database. As such, the number of read and write operations that can be performed by multiple planning processes to a centralized database, such as database 28, is not proportional to the number of planning processes used. In fact, centralized databases typically behave anti-proportionately as more and more processes are used which read and write data, because of thrashing (degraded performance because miss rate too high) and the negative performance effects of read/write contentions. Therefore, the overall performance of a system using multiple planning processes versus a single planning process for large scale supply chain planning is not significantly improved.

SUMMARY OF THE INVENTION

According to the present invention, problems and disadvantages associated with previous techniques for performing large scale supply chain planning may be substantially reduced or eliminated.

According to one embodiment of the present invention, a system and method for performing large scale supply chain planning includes at least one database with a plurality of partitions. A large scale, supply chain planning problem is decomposed into a plurality of independent and isolated sub-problems. The data for each sub-problem is maintained in a separate database partition. The sub-problems are solved by separate planning processes operating in parallel in a distributed database processing environment.

Certain embodiments of the present invention may provide one or more technical advantages over previous techniques. For example, the supply chain planning system and method of the present invention performs the read and write operations for different sub-problems on data maintained in separate database partitions. Also, the different sub-problems are solved in parallel. By maintaining the data for the different sub-problems in separate partitions, and solving the sub-problems in parallel, the potential effects of thrashing and database read/write contentions may be minimized. Consequently, the scalability, efficiency, and performance of the overall supply chain planning system and process may be significantly improved. Furthermore, by processing a plurality of planning problems in parallel, the elapsed time for the overall supply chain planning process may be reduced nearly proportionately to the number of processors available in the distributed system. Other technical advantages of the present invention may be readily apparent to one skilled in the art from the included figures, description and claims.

BRIEF DESCRIPTION OF THE DRAWINGS

For a more complete understanding of the present invention and its advantages, reference is now made to the following descriptions, taken in conjunction with the accompanying drawings, in which.

DESCRIPTION OF EXAMPLE EMBODIMENTS

The preferred embodiment of the present invention and its advantages are best understood by referring to FIGS. 1-5 of the drawings, like numerals being used for like and corresponding parts of the various drawings.

Figure 1:
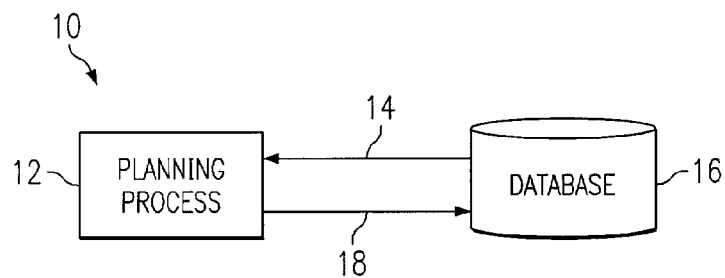
FIG. 1 illustrates a typical supply chain planning system.
Figure 2:
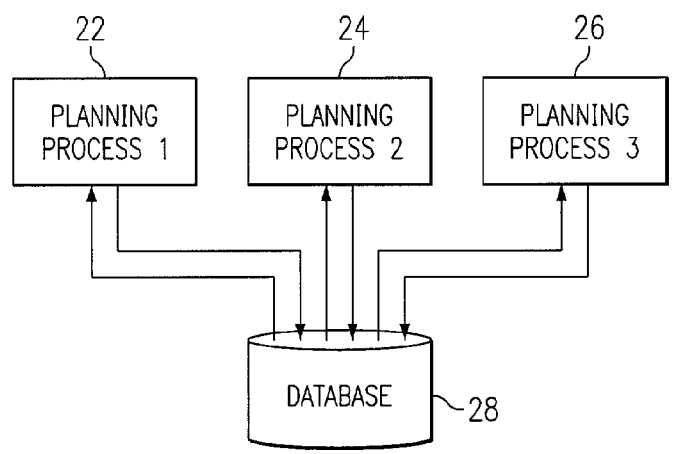
FIG. 2 illustrates how a planning process for a large scale supply chain can be performed more rapidly than the planning process shown in FIG. 1.
Figure 3:
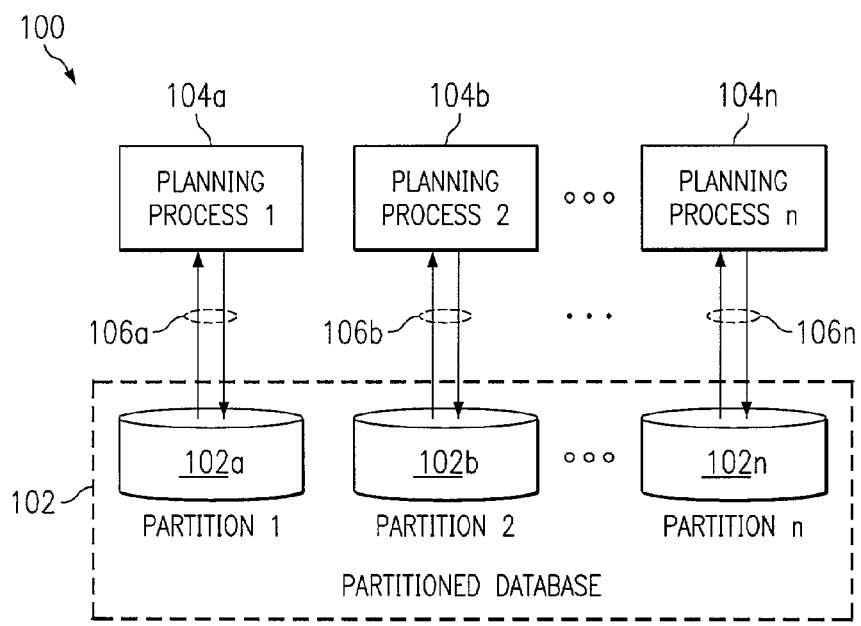
FIG. 3 illustrates an example distributed, parallel supply chain planning system, in accordance with one embodiment of the present invention.

FIG. 3 illustrates an example system 100 for solving a large-scale supply chain planning problem, in accordance with one embodiment of the present invention. For this example embodiment, a partitionable database technology is preferably used. For example, a partitionable database, such as an Oracle® 8i Database, Enterprise Edition with Partitioning Option, can be used. System 100 includes a database 102 with a plurality of partitions 102(*a*), 102(*b*), . . . 102(*n*), and a corresponding number of planning process applications 104(*a*), 104(*b*), . . . 104(*n*). Although database 102 is described in this example as including three partitions (i.e. n=3), database 102 can include two or more partitions in accordance with particular planning process design needs. Preferably, the number of partitions is selected to equal the number of planning process applications to be used.

Each planning process application 104(*a-n*) is coupled to a corresponding partition 102(*a-n*) by a respective communication link 106(*a-n*) for database read and write operations. A respective computer processor (not shown) can be used to execute the planning software for each planning process application 104(*a-n*). Notably, by linking each planning process application (and processor) to a different database partition, in accordance with this embodiment of the present invention, the database read and write contention problems experienced by previous systems may be eliminated.

In operation, a supply chain planning problem is divided (e.g., by a system planner or designer) into a plurality of independent, isolated sub-problems (e.g., N sub-problems). For this example, a large-scale supply chain planning problem is split into three independent, isolated sub-problems (i.e., N=3). Each sub-problem is assigned to be solved by a different planning process application, such as for example, 104(*a*)-(*c*).

The process of dividing a large-scale planning problem into a plurality of sub-problems is referred to as "decomposition". A primary goal of the decomposition process is to identify the smallest possible, independent sub-problems (referred to as "clusters"), and create larger sub-problems (referred to as "partitions") made up of clusters. The sub-problem partitions are developed with clusters and sized to fit into respective database partitions. From a technical standpoint, the database partitions may be sized equally for optimum performance. Therefore, the decomposition process is also responsible for filling up the database partitions with clusters, preferably such that they are as close to equal in size as possible.

For this embodiment, a cluster can be represented by a set of items (e.g., inventory data) that are related with respect to the planning problem to be solved. Notably, the present invention is not limited to this definition of a cluster. For example, a cluster can also include items at different locations or other entities. As such, a cluster can be identified by certain rules. Each rule defines a relationship between two or more items. If the decomposition process identifies a relationship between any two items, the two items are preferably placed in the same cluster.

Specifically, a clustering algorithm executed by the decomposition process initially creates a cluster for each item related to the planning problem to be solved. As the relationship rules related to a cluster are processed, the clustering algorithm identifies any relationship that exists between items in different clusters, and merges these clusters. When no additional relationships between items in the resulting clusters can be identified, the clustering algorithm is terminated. A result or output of a clustering algorithm is a set of independent clusters.

A sub-problem partition is represented by a set of independent clusters. Preferably, during the process of developing sub-problem partitions from clusters, all of these partitions are sized as close to equal as possible. All of the data elements associated with each item in a sub-problem partition are then stored in a corresponding physical database partition. For example, all of the data elements for a sub-problem partition associated with planning process application 104(*a*) may be stored in partition 102(*a*), all of the data elements for planning process application 104(*b*) may be stored in partition 102(*b*), and so on.

Notably, although the use of clusters to develop sub-problem partitions during the decomposition process is preferred, decomposition can also be performed without clusters. For example, sub-problem partitions can be created directly for items related to the planning problem to be solved. An appropriate partition identification label or PARTITION_ID can be assigned to each item residing in the respective sub-problem partitions. The decomposition algorithm can then assign the data for each item to an appropriate database partition.

Preferably (returning to the use of clusters), before any data is initially loaded into the database 102 for production purposes, only that data which is relevant to the decomposition process is loaded into a default database partition. This data stored in the default partition is processed by the decomposition algorithm in accordance with the decomposition rules imposed. The decomposition algorithm is then executed to produce the independent sets of clusters and the partition assignments of data. Next, all of the data to be used for production purposes is loaded in the database 102. During the process of loading the data into database 102, the partition assignments derived by the decomposition algorithm are used to store the sub-problem partition data in an appropriate database partition 102(*a-n*).

The present invention also covers the incremental situation whereby decomposition and/or business rules are changed, or data associated with new items are added to or deleted from the database 102 over a period of time. In this case, the existing database partitioning scheme is preferably changed as little as possible in order to maintain database stability, because the process of re-partitioning data in a database can be very expensive in terms of lost time.

For the incremental situation described above, if new items are to be loaded into the database 102, the data associated with each new item are loaded into a default database partition. The decomposition algorithm detects the existence of the new items stored in the default partition and then creates one or more new clusters from that data, or merges the data with existing clusters, in accordance with the existing decomposition and/or business rules imposed. For this embodiment, a rebalancing algorithm is preferably executed, which rearranges the database partition assignment for the new (or changed) clusters, as needed. Whenever an existing cluster is to be changed, the partition decomposition algorithm moves all of the data associated with that cluster from the originally-assigned partition to the newly-assigned partition (if a different partition is assigned). A similar workflow process is performed if a relationship rule is changed. As such, during the incremental decomposition process, if items and/or relationship rules are deleted but not added, then the existing clusters are not changed to ensure that the partition assignments are not disturbed. Alternatively, for example, existing clusters can be changed without disturbing the partition assignments, by re-clustering the items in the clusters affected. In sum, the incremental decomposition algorithm processes only a subset of the data that is processed by the initial decomposition algorithm. Consequently, an incremental decomposition can be executed faster than an initial decomposition.

Figure 4:
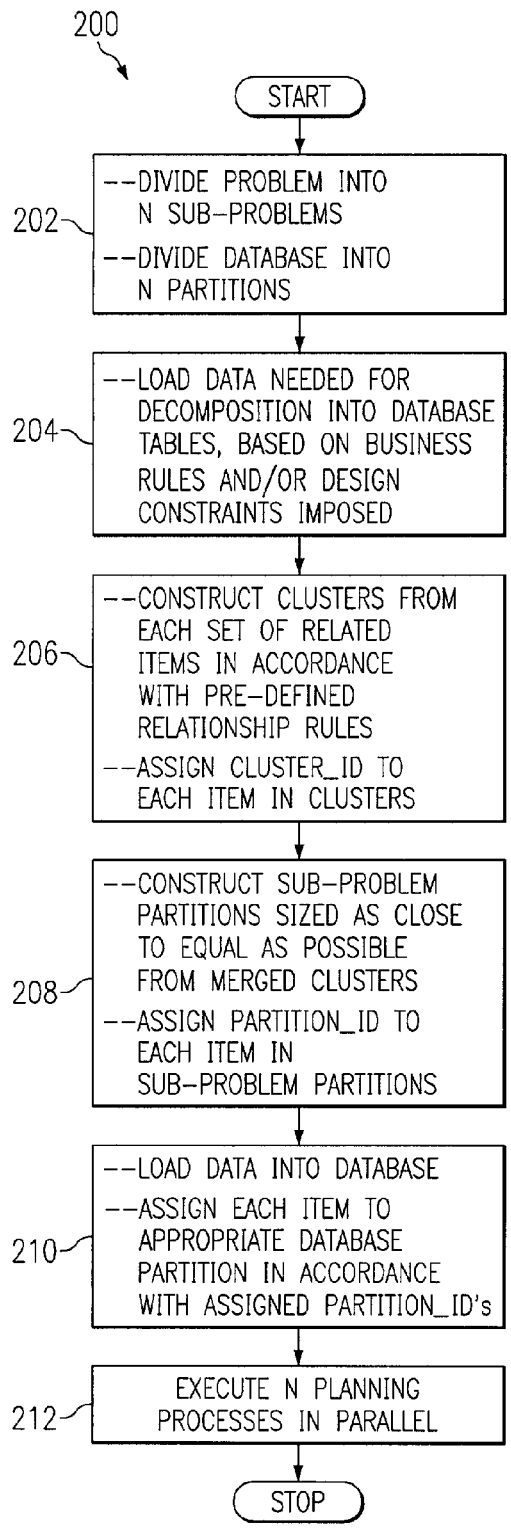
FIG. 4 illustrates an example method for solving a large-scale supply chain problem, in accordance with one embodiment of the present invention.

FIG. 4 illustrates an example method 200 for solving a large-scale supply chain problem, in accordance with one embodiment of the present invention. For example, the decomposition algorithm described directly above can be implemented for initial database loading and planning execution, in accordance with the method shown in FIG. 4. At step 202, the decomposition algorithm divides the supply chain problem into N sub-problems, and divides the database 102 into N partitions. Referring to the system shown in FIG. 3, the database 102 is divided into 3 partitions 102(a)-102(c). At step 204, a processor (not shown) loads the data needed for decomposition purposes into appropriate tables in the database 102, in accordance with the business rules and design constraints imposed. At step 206, a clustering algorithm (e.g., part of the decomposition algorithm) iteratively constructs a plurality of clusters, with each such cluster composed of items associated by a pre-defined set of relationship rules. As the clusters are developed, the clustering algorithm assigns an appropriate cluster identification label (e.g., cluster #1) or CLUSTER_ID to each item residing in the respective clusters. At step 208, the clustering algorithm constructs N sub-problem partitions by merging clusters having related items. As the sub-problem partitions are developed, the clustering algorithm assigns an appropriate partition identification label (e.g., partition #1) or PARTITION_ID to each item residing in the respective sub-problem partitions. The clustering algorithm also sizes the sub-problem partitions as close to equal as possible. The clustering algorithm is terminated when no additional relationships between items in different clusters can be identified. At this point, sets of independent clusters are associated with respective sub-problem partitions, and these sub-problem partitions are sized as close to equal as possible. At step 210, the decomposition algorithm loads the data associated with each item into database 102. While the data are being stored, the decomposition algorithm assigns the data for each item to an appropriate database partition (e.g., 102(a)-102(c)) according to each item's PARTITION_ID. At step 212, the N planning process applications (e.g., 104(a)-(c)) can be executed in parallel. In accordance with the present invention, each planning process application accesses data in a respective database partition, which eliminates the read/write contention problems experienced by prior planning processes.

Figure 5:
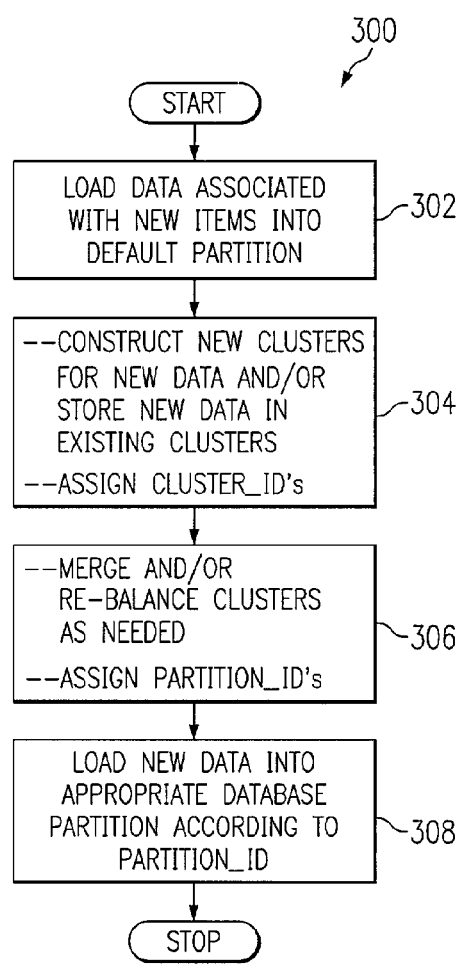
FIG. 5 illustrates an example method for solving a large-scale supply chain problem, in accordance with a second embodiment of the present invention.

FIG. 5 illustrates an exemplary method 300 for solving a large-scale supply chain problem, in accordance with a second embodiment of the present invention. For example, the decomposition algorithm described above can be implemented for incremental database loading and planning execution, in accordance with the method shown in FIG. 5. At step 302, the decomposition algorithm loads all data associated with any new items(s) temporarily into a default database partition (e.g., 102(d)). At step 304, the clustering algorithm constructs one or more new clusters for the new data, and/or associates some or all of the new data in one or more existing clusters. The clustering algorithm then assigns an appropriate CLUSTER_ID to each new item. At step 306, the clustering algorithm iteratively merges one or more of the new clusters, if any, and/or re-balances the existing clusters as needed to form suitable sub-problem partitions. Notably, it is preferable to merge or re-balance the clusters in such a way that the movement of data across the database partitions is minimized. The clustering algorithm then assigns an appropriate PARTITION_ID to each item, as needed, in the resulting sub-problem partition(s). At step 308, the decomposition algorithm loads the data associated with the new items into the appropriate database partition(s), in accordance with the assigned PARTITION_ID. Advantageously, in accordance with the present invention, the example decomposition methods shown in FIG. 4 and produce a relatively high level of scalability for large-scale supply chain planning problems compared to previous methods.

Although a preferred embodiment of the method and apparatus of the present invention has been illustrated in the accompanying drawings and described in the foregoing description, it will be understood that the invention is not limited to the embodiment disclosed, but is capable of numerous rearrangements, modifications and substitutions without departing from the spirit of the invention as set forth and defined by the following claims.

What is claimed is:

1. A computer-implemented method for solving a supply chain planning problem, comprising:
    decompositioning said supply chain planning problem into a plurality of independent sub-problems, said supply chain planning problem comprising a plurality of planning problems, at least one of said plurality of planning problems is a service level planning problem, wherein said supply chain planning problem further comprises computing at least one safety stock limit for an item;
    providing a plurality of distributed database partitions, each partition of said plurality of distributed database partitions associated with a respective independent sub-problem of said plurality of planning problems;
    operating a plurality of processors, each processor of said plurality of processors coupled with a respective partition of said plurality of distributed database partitions;
    forming a plurality of distributed sub-problem partitions, each of said distributed sub-problem partitions including a plurality of related items and associated with a respective independent sub-problem of said plurality of planning problems;
    loading data into a plurality of distributed database partitions, said data associated with said plurality of related items, and each of said distributed database partitions associated with a respective one of each of said distributed sub-problem partitions; and
    solving each of said plurality of said independent sub-problems by each processor of said plurality of processors coupled with said respective partition of said plurality of distributed database partitions, wherein each processor of said plurality of processors is operating in parallel.

2. The method of claim 1, further comprising:
forming a plurality of clusters, each of said clusters including said plurality of related items; and
forming said plurality of distributed sub-problem partitions from said plurality of clusters.

3. The method of claim 2, wherein the act of forming said plurality of said clusters further comprises an act of assigning a CLUSTER_ID to each item of said plurality of related items.

4. The method of claim 2, wherein the act of forming a plurality of distributed sub-problem partitions from said plurality of clusters further comprises an act of equally sizing said distributed sub-problem partitions.

5. The method of claim 1, wherein the number of distributed sub-problems is equal to the number of database partitions.

6. The method of claim 1, wherein said plurality of related items are related by one or more pre-defined relationship rules.

7. The method of claim 1, wherein the act of solving each of said plurality of said distributed sub-problems further comprises an act of solving said plurality of independent sub-problems in parallel.

8. The method of claim 1, wherein at least one of said plurality of planning problems is a replenishment planning problem.

9. A computer-implemented method for solving a supply chain planning problem, comprising:
decompositioning said supply chain planning problem into a plurality of independent sub-problems, said supply chain planning problem comprising a plurality of planning problems, at least one of said plurality of planning problems is a service level planning problem, wherein said supply chain planning problem further comprises computing at least one safety stock limit for an item;
providing a plurality of distributed database partitions, each partition of said plurality of distributed database partitions associated with a respective independent sub-problem of said plurality of planning problems;
operating a plurality of processors, each processor of said plurality of processors associated with a respective partition of said plurality of distributed database partitions;
storing data associated with at least one new item in a temporary database location;
forming at least one cluster, said at least one cluster including said data associated with said at least one item;
merging said at least one cluster with at least one cluster associated with at least one distributed sub-problem partition;
loading said data into at least one distributed database partition, said at least one distributed database partition associated with said at least one distributed sub-problem partition; and
solving said at least one independent sub-problem by each processor of said plurality of processors coupled with said respective partition of said plurality of distributed database partitions, wherein each processor of said plurality of processors is operating in parallel.

10. A computer-implemented system for solving a supply chain planning problem, comprising:
a storage medium stored therein a plurality of independent sub-problems decomposed from said supply chain planning problem, said supply chain planning problem comprising a plurality of planning problems, at least one of said plurality of planning problems is a service level planning problem, wherein said supply chain planning problem further comprises computing at least one safety stock limit for an item;
a database, said database including a plurality of distributed database partitions, each partition of said plurality of distributed database partitions associated with a respective independent sub-problem of said plurality of planning problems; and
a plurality of processors, each processor of said plurality of processors coupled with a respective partition of said plurality of distributed database partitions, and configured to:
form a plurality of distributed sub-problem partitions, each of said distributed sub-problem partitions including a plurality of related items and associated with a respective independent sub-problem of said plurality of planning problems;
load data into a plurality of distributed database partitions, said data associated with said plurality of related items, and each of said distributed database partitions associated with a respective one of each of said distributed sub-problem partitions; and
solve said plurality of said independent sub-problems by each processor of said plurality of processors coupled with said respective partition of said plurality of distributed database partitions, wherein each processor of said plurality of processors is operating in parallel.

11. The system of claim 10, wherein each processor of said plurality of processors are further configured to:
form a plurality of clusters, each of said clusters including said plurality of related items; and
form said plurality of distributed sub-problem partitions from said plurality of clusters.

12. The system of claim 11, wherein each processor of said plurality of processors is further configured to:
assign a CLUSTER_ID to each item of said plurality of related items.

13. The system of claim 10, wherein the number of distributed sub-problems is equal to the number of database partitions.

14. The system of claim 10, wherein said plurality of related items are related by one or more pre-defined relationship rules.

15. The system of claim 10, wherein each processor of said plurality of processors is further configured to:
equally size said distributed sub-problem partitions.

16. The system of claim 10, wherein each processor of said plurality of processors is further configured to:
solve said plurality of independent sub-problems in parallel.

17. The system of claim 10, wherein at least one of said plurality of planning problems is a replenishment planning problem.

18. A computer-implemented system for solving a supply chain planning problem, comprising:
a storage medium stored therein a plurality of independent sub-problems decomposed from the supply chain planning problem, said supply chain planning problem comprising a plurality of planning problems, at least one of said plurality of planning problems a service level planning problem, wherein said supply chain planning problem further comprises computing at least one safety stock limit for an item;
a database, said database comprising a plurality of distributed database partitions and a temporary storage location, each partition of said plurality of distributed database partitions associated with a respective independent sub-problem of said plurality of planning problems; and a plurality of processors, each processor of said plurality of processors coupled with a respective partition of said plurality of distributed database partitions, and configured to:

store data associated with at least one new item in the temporary database location;

form at least one cluster, said at least one cluster including said data associated with said at least one item;

merge said at least one cluster with at least one cluster associated with at least one distributed sub-problem partition;

load said data into at least one distributed database partition, said at least one distributed database partition associated with said at least one distributed sub-problem partition; and solve said at least one independent sub-problem by each processor of said plurality of processors coupled with said respective partition of said plurality of distributed database partitions, wherein each processor of said plurality of processors is operating in parallel.

19. Software for solving a supply chain planning problem, the software being embodied in computer-readable media and when executed using one or more computers is configured to:

decompose the supply chain planning problem into a plurality of independent sub-problems, said supply chain planning problem comprising a plurality of planning problems, at least one of said plurality of planning problems is a service level planning problem, wherein said supply chain planning problem further comprises computing at least one safety stock limit for an item;

provide a plurality of distributed database partitions, each partition of said plurality of distributed database partitions associated with a respective independent sub-problem of said plurality of planning problems;

operate a plurality of processors, each processor of said plurality of processors coupled with a respective partition of said plurality of distributed database partitions;

form a plurality of distributed sub-problem partitions, each of said distributed sub-problem partitions including a plurality of related items and associated with a respective independent sub-problem of said plurality of planning problems;

load data into a plurality of distributed database partitions, said data associated with said plurality of related items, and each of said distributed database partitions associated with a respective one of each of said distributed sub-problem partitions; and solve each of said plurality of said independent sub-problems by each processor of said plurality of processors coupled with said respective partition of said plurality of distributed database partitions, wherein each processor of said plurality of processors is operating in parallel.

20. The software of claim 19, when executed further configured to:

form a plurality of clusters, each of said clusters including said plurality of related items; and form said plurality of distributed sub-problem partitions from said plurality of clusters.

21. The software of claim 20, wherein forming said plurality of said clusters further comprises assigning a CLUSTER_ID to each item of said plurality of related items.

22. The software of claim 20, wherein forming a plurality of distributed sub-problem partitions from said plurality of clusters further comprises equally sizing said distributed sub-problem partitions.

23. The software of claim 19, wherein the number of distributed sub-problems is equal to the number of database partitions.

24. The software of claim 19, wherein said plurality of related items are related by one or more pre-defined relationship rules.

25. The software of claim 19, wherein solving each of said plurality of said distributed sub-problems further comprises solving said plurality of distributed sub-problems in parallel.

26. The software of claim 19, wherein at least one of said plurality of planning problems is a replenishment planning problem.

27. Software for solving a supply chain planning problem, the software being embodied in computer-readable media and when executed using one or more computers is configured to:

decompose the supply chain planning problem into a plurality of independent sub-problems, said supply chain planning problem comprising a plurality of planning problems, at least one of said plurality of planning problems is a service level planning problem, wherein said supply chain planning problem further comprises computing at least one safety stock limit for an item;

provide a plurality of distributed database partitions, each partition of said plurality of distributed database partitions associated with a respective independent sub-problem of said plurality of planning problems;

operate a plurality of processors, each processor of said plurality of processors coupled with a respective partition of said plurality of distributed database partitions;

store data associated with at least one new item in a temporary database location;

form at least one cluster, said at least one cluster including said data associated with said at least one item;

merge said at least one cluster with at least one cluster associated with at least one distributed sub-problem partition;

load said data into at least one distributed database partition, said at least one distributed database partition associated with said at least one distributed sub-problem partition; and solve said at least one independent sub-problem by each processor of said plurality of processors coupled with said respective partition of said plurality of distributed database partitions, wherein each processor of said plurality of processors is operating in parallel.

* * * * *